US012736673B1

(12) United States Patent
Basavaraj et al.

(10) Patent No.: US 12,736,673 B1
(45) Date of Patent: Sep. 15, 2026

(54) TIME-OF-FLIGHT BASED COVER DETECTION FOR NETWORK DEVICES

(71) Applicant: Cisco Technology, Inc., San Jose, CA (US)

(72) Inventors: Abhishek Gubbi Basavaraj, Milpitas, CA (US); Frank Xavier Romero, Milpitas, CA (US); Anand Rajamani, San Jose, CA (US); Aumen Kwok Lee, Plano, TX (US)

(73) Assignee: CISCO TECHNOLOGY, INC., San Jose, CA (US)

(*) Notice: Subject to any disclaimer, the term of this patent is extended or adjusted under 35 U.S.C. 154(b) by 1039 days.

(21) Appl. No.: 17/942,703

(22) Filed: Sep. 12, 2022

Related U.S. Application Data

(60) Provisional application No. 63/357,778, filed on Jul. 1, 2022.

(51) Int. Cl.
*G01S 17/08* (2006.01)
*G01S 7/481* (2006.01)

(52) U.S. Cl.
CPC ............ *G01S 17/08* (2013.01); *G01S 7/4813* (2013.01); *G01S 7/4814* (2013.01); *G01S 7/4816* (2013.01)

(58) Field of Classification Search
CPC ...... G01S 17/08; G01S 7/4813; G01S 7/4817; G01S 7/4816
See application file for complete search history.

(56) References Cited

U.S. PATENT DOCUMENTS

2019/0172189 A1* 6/2019 Pop ........................... G06T 7/00
2019/0257948 A1* 8/2019 Birnbarcher .......... G01S 17/107
2020/0284883 A1 9/2020 Ferreira et al.
2020/0412087 A1* 12/2020 Shen ..................... H01S 5/0428
2022/0083048 A1 3/2022 Cella et al.
2022/0171058 A1 6/2022 Mitomi
(Continued)

OTHER PUBLICATIONS

Cisco, "Cisco Catalyst IR8140 Heavy Duty Series Router Software Configuration Guide," Americas Headquarters, www.cisco.com, published Jul. 9, 2021, 288 pages.
(Continued)

*Primary Examiner* — Helal A Algahaim
*Assistant Examiner* — Evan H. Haut
(74) *Attorney, Agent, or Firm* — Edell, Shapiro & Finnan, LLC

(57) ABSTRACT

Presented herein is an apparatus including: a network device housing including a slot configured to receive a network device module; a time-of-flight sensor including an emitter and a receiver, wherein the time-of-flight sensor is arranged within the network device housing such that the emitter and the receiver have line-of-sight to a location relative to the network device housing at which a cover for the slot is arranged; and one or more processors communicatively coupled to the time-of-flight sensor.

Also presented herein is a method including: obtaining, from a time-of-flight sensor arranged within a slot of a network device housing, time-of-flight sensor data; determining a distance between the time-of-flight sensor and a target based upon the time-of-flight sensor data; and determining, based upon the distance, that a cover is covering the slot or that the cover is not covering the slot.

20 Claims, 9 Drawing Sheets

(56) References Cited

U.S. PATENT DOCUMENTS

2024/0031909 A1* 1/2024 Yue et al. ............. H04W 48/02

OTHER PUBLICATIONS

Senadeera, et al., Journal of Low Power Electronics and Applications, "Cost-Effective and Low Power IoT-Based Paper SupplyMonitoring System: An Application Modeling Approach," MDPI, retrieved Jul. 7, 2022.

Pease, Journal of Network and Computer Applications, ResearchGate, published Oct. 2017, "Hybrid ToF and RSSI Real-Time Semantic Tracking with an Adaptive Industrial Internet of Things Architecture," 15 pages.

* cited by examiner

TOF SENSOR
215a
TOF SENSOR
215b
300
305

TIME-OF-FLIGHT BASED COVER DETECTION FOR NETWORK DEVICES

CROSS REFERENCE TO RELATED APPLICATION

This application claims priority to U.S. Provisional Application No. 63/357,778 filed on Jul. 1, 2022 and entitled "TIME-OF-FLIGHT BASED SLOTS FOR NETWORK DEVICES," the contents of which are hereby incorporated by reference in their entirety.

TECHNICAL FIELD

The present disclosure relates to network devices and network device ingress protection.

BACKGROUND

Ingress protection ratings refer to the level of protection offered by an electrical enclosure against solids and liquids. In an environment where dust or water could damage electronic components, a sealed enclosure is used to prevent such ingress and safe house the electronics. Devices implementing certain standards, such as Ingress Protection Standard 67 (IP67), may often include functionality that provides an alert when a rated device is uncovered or open.

Related art ingress protection rated network devices do not electrically detect if an empty module slot has a blank cover installed or not. Instead, related art devices utilize mechanical switches to determine whether or not a cover is present. If the blank cover is not installed, then external weather elements (rain, dust, snow, etc.) may enter the network device and cause the network device to fail.

DETAILED DESCRIPTION

Overview

Provided for herein is an apparatus including: a network device housing including a slot configured to receive a network device module; a time-of-flight sensor including an emitter and a receiver, wherein the time-of-flight sensor is arranged within the network device housing such that the emitter and the receiver have line-of-sight to a location relative to the network device housing at which a cover for the slot is arranged; and one or more processors communicatively coupled to the time-of-flight sensor.

Also provided for herein is a method including: obtaining, from a time-of-flight sensor arranged within a slot of a network device housing, time-of-flight sensor data; determining a distance between the time-of-flight sensor and a target based upon the time-of-flight sensor data; and determining, based upon the distance, that a cover is covering the slot or that the cover is not covering the slot.

The techniques disclosed herein also provide for one or more tangible, non-transitory computer readable mediums encoded with instructions, wherein the instructions, when executed by one or more processors, are operable to: obtain, from a time-of-flight sensor arranged within a slot of a network device housing, time-of-flight sensor data; determine a distance between the time-of-flight sensor and a target based upon the time-of-flight sensor data; and determine, based upon the distance, that a cover is covering the slot or that the cover is not covering the slot.

EXAMPLE EMBODIMENTS

Figure 1A:
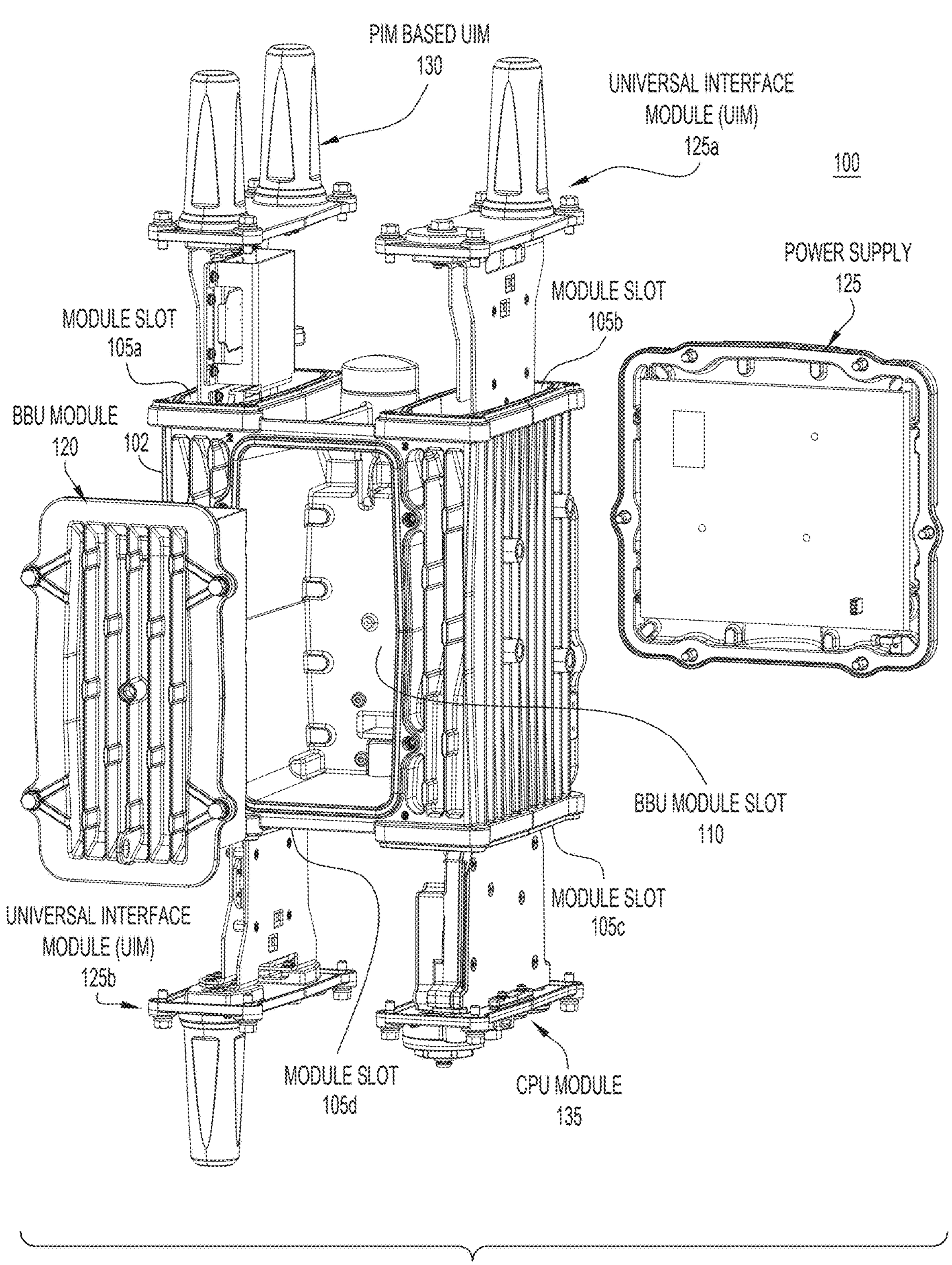
FIG. 1A is an exploded view diagram of a network device configured to implement the time-of-flight sensor-based cover detection techniques of the present disclosure, according to an example embodiment.
Figure 1B:
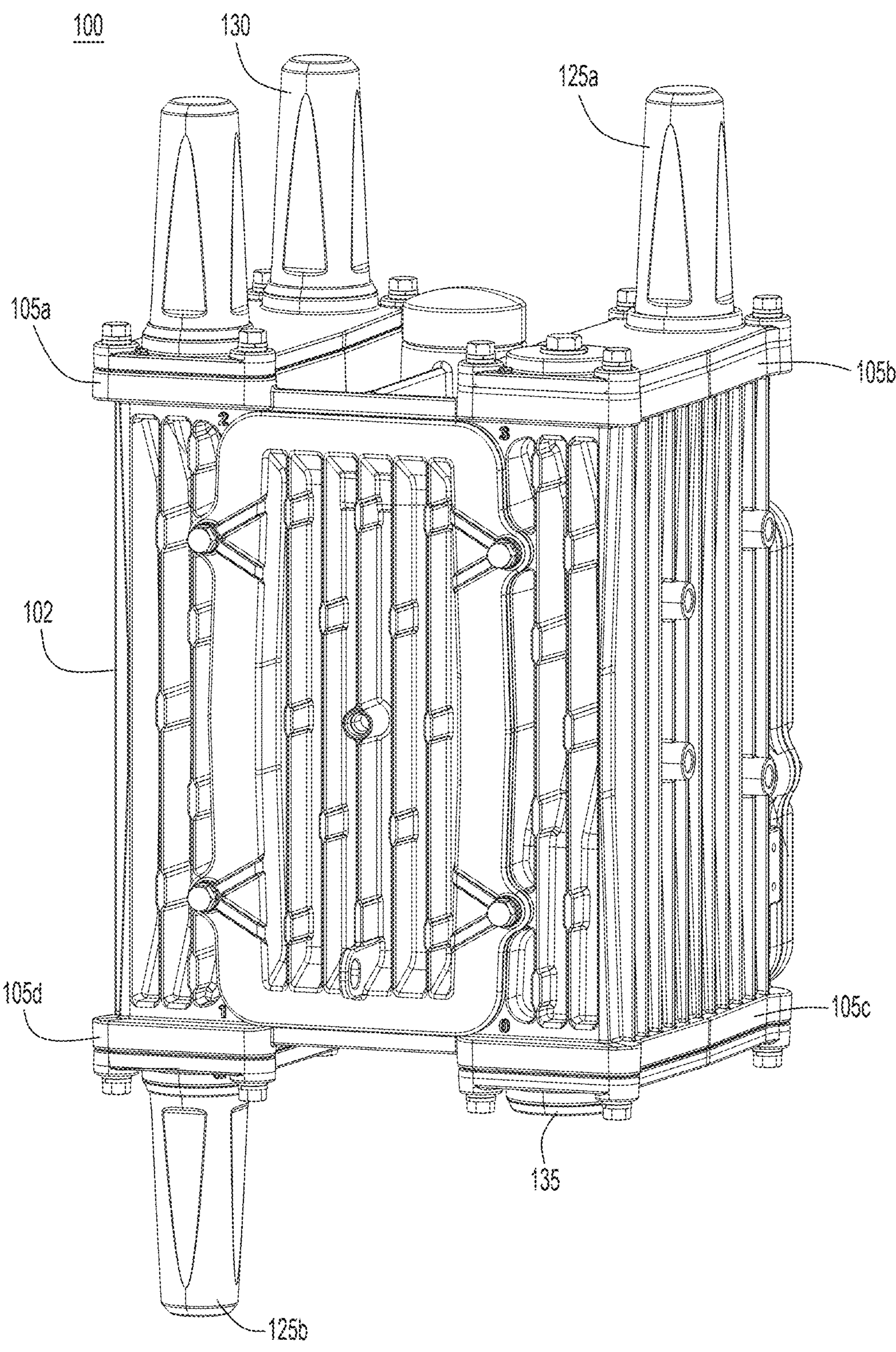
FIG. 1B is a perspective view of a network device configured to implement the time-of-flight sensor-based cover detection techniques of the present disclosure, in which all slots of the network device include a network device module, according to an example embodiment.
Figure 1C:
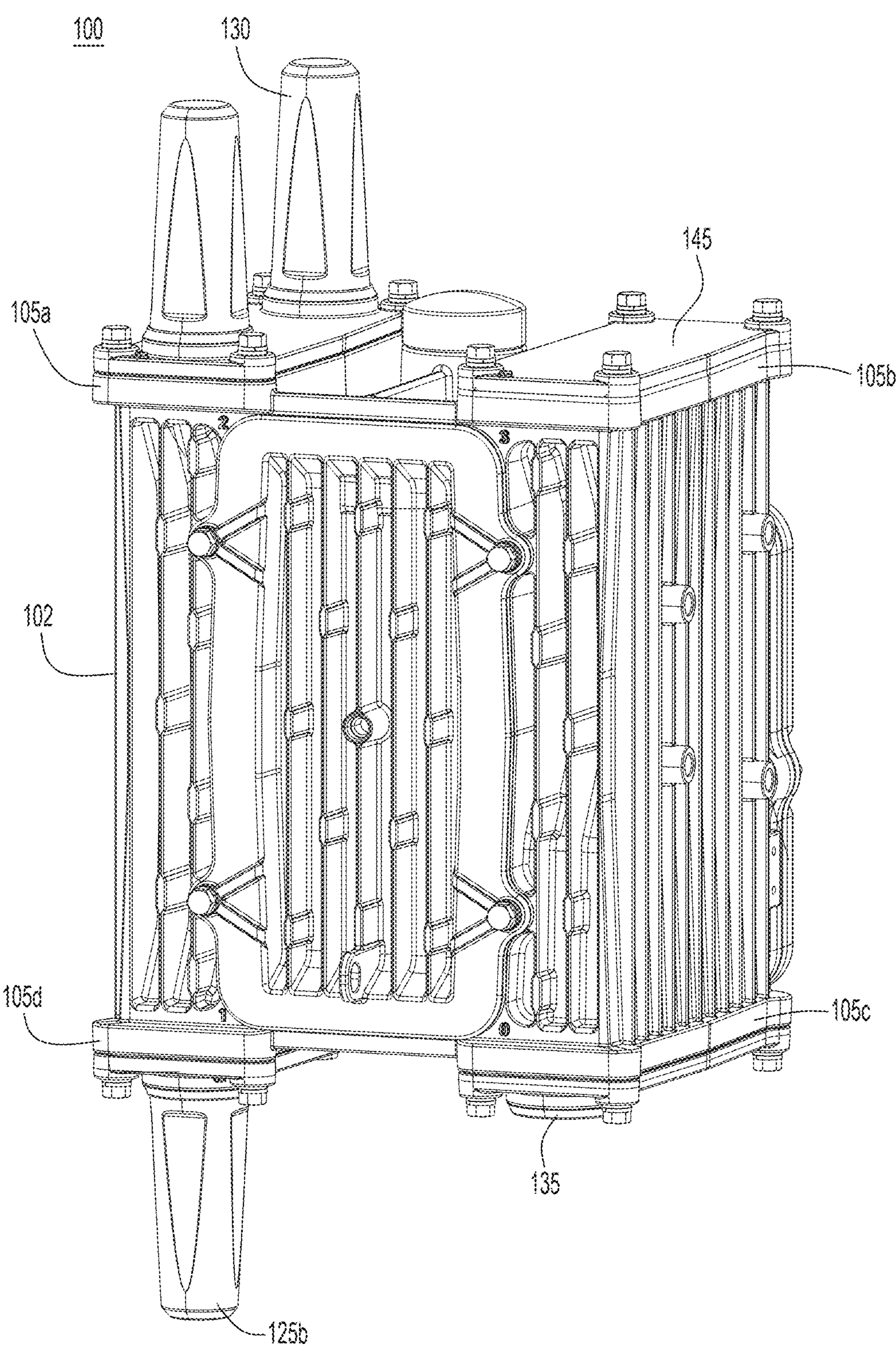
FIG. 1C is a perspective view of a network device configured to implement the time-of-flight sensor-based cover detection techniques of the present disclosure, in which one slot of the network device is provided with a cover, according to an example embodiment.

Illustrated in FIGS. 1A-C is a network device, an Industrial Internet-of-things (IIOT) router 100 in this specific example embodiment, configured according to techniques disclosed herein. As described below, module slots, specifically module slots 105*a-d*, are formed in the housing 102 of the IIOT router 100. The module slots 105*a-d* are configured to receive network device modules that allow the network device to provide different functionality. According to the specific example of FIGS. 1A-C, module slots 105*a*, 105*b* and 105*d* are configured as Universal Interface Module (UIM) slots, while module slot 105*c* is configured as a Supervisor (SUPV) module slot. The types of modules that may be installed in UIM module slots may include multi-carrier band modules, advanced Long-Term-Evolution (LTE) modules, wide area network (WAN) modules, local area network (LAN) modules, wireless personal area network (WPAN) modules, fourth generation broadband cellular network (4G) modules, fifth generation broadband cellular network (5G) modules, video graphics processing unit (GPU) modules, and Wi-Fi® modules, among others. SUPV module slots may be configured to receive Central Processing Unit (CPU) modules.

According to the disclosed techniques, one or more of module slots 105*a-d* are equipped with time-of-flight sensor-based circuitry (illustrated in FIGS. 3 and 4) which enables the IIOT router 100 to electrically detect if one or more of module slots 105*a-d* is covered or not. Accordingly, IIOT router 100 uses time-of-flight sensors to determine if covers are placed over one or more of slots 105*a-d*. Other example embodiments may utilize time-of-flight sensors to determine if battery back-up module (BBU) slot 110 is open, closed to the external environment or includes BBU module 120. Similarly, a time-of-flight sensor may be used to determine whether or not the power supply slot (on the back of the IIOT router 100 illustrated in FIGS. 1A-C) is open, closed to the external environment or includes power supply 125.

As illustrated in FIGS. 1A-C, IIOT router 100 may be configured with different modules within slots 105*a-d*. For example, FIG. 1A illustrates an LTE Pluggable Interface Module (PIM) module 130, a UIM module 125*a*, a Central Processing Unit (CPU) module 135, and a WPAN UIM module 125*b*. FIG. 1B illustrates these modules arranged within module slots 105*a-d*, respectively. Depending on the use case for IIOT router 100, one or more of module slots 105*a-d* may not be utilized by a module. For example, as illustrated in FIG. 1C, a cover 145 is placed over module slot 105*b* because module slot 105*b* is not being occupied by a module. Cover 145 ensures that IIOT router 100 is provided with sufficient ingress protection for its use case. In the case of outdoor industrial routers, such as IIOT router 100, cover 145 may provide sufficient ingress protection to meet IP67 requirements. Other network devices may need to provide higher or lower levels of ingress protection, which may be provided by an appropriate cover. Of course, a cover can only provide ingress protection if it is present and appropriately secured to the network device. Accordingly, IIOT router 100 is configured with time-of-flight sensors that allow a processor of IIOT router 100, such as the processor of CPU module 135, to determine whether or not cover 145 is correctly installed on module slot 105*b*.

With reference now made to FIGS. 2A-D, illustrated therein are time-of-flight sensors 215 and a number of targets 230*a-c* arranged at different distances 235*a-c* from time-of-flight sensor 215. The signals provided by time-of-flight sensor 215 allows a controller or processor of a network device, such as IIOT router 100 of FIGS. 1A-C, to determine the distance to the targets 230*a-c*. Based upon the determined distance, the processor may determine whether the target represents an appropriately installed cover, or another obstruction or device contained within one or more slots, such as module slots 105*a-d* of FIGS. 1A-C.

Time-of-flight sensor 215 measures the distance travelled by signals 218*a*, 218*b*, 218*c* and 218*d* (218*a-d*) emitted from emitter 220 to targets 230*a-c* from which the light is reflected back as reflected signals 222*a*, 222*b*, 222*c* (222*a-c*). According to specific example embodiments, emitter 220 may be embodied as a laser emitter, such as a laser diode, and receiver 225 may be embodied as a photodetector, such as a photodetector diode. According to more specific embodiments, emitter 220 may be configured to emit laser light with a wavelength in the infrared spectrum, such as with a wavelength of 940 nm. Similarly, receiver 225 may be configured to detect the same wavelength of radiation emitted by emitter 220.

Figure 2A:
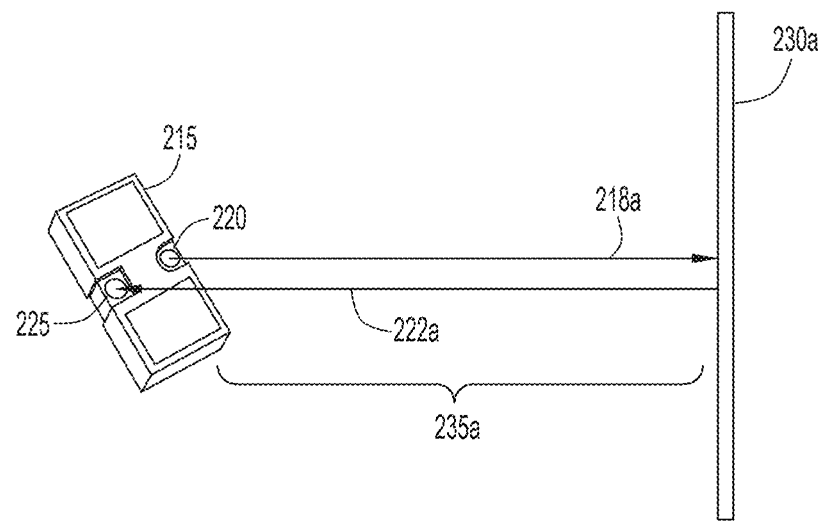
FIG. 2A illustrates a time-of-flight sensor implementing the time-of-flight sensor-based cover detection techniques of the present disclosure, in which the time-of-flight sensor senses a first distance from the sensor to a target, according to an example embodiment.
Figure 2B:
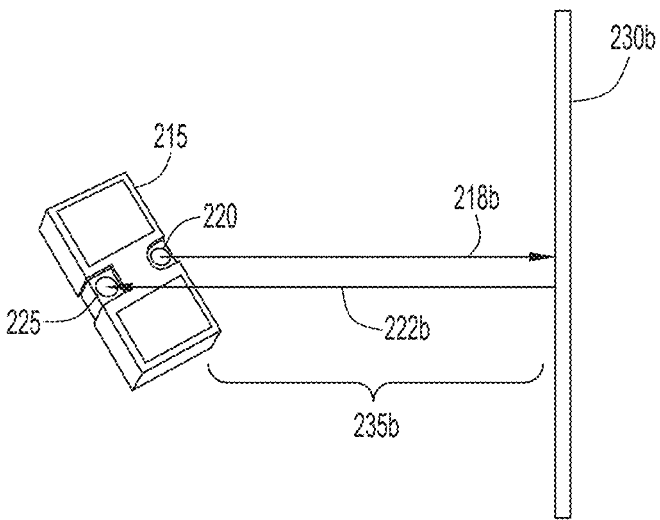
FIG. 2B illustrates a time-of-flight sensor implementing the time-of-flight sensor-based cover detection techniques of the present disclosure, in which the time-of-flight sensor senses a second distance from the sensor to a target, according to an example embodiment.
Figure 2C:
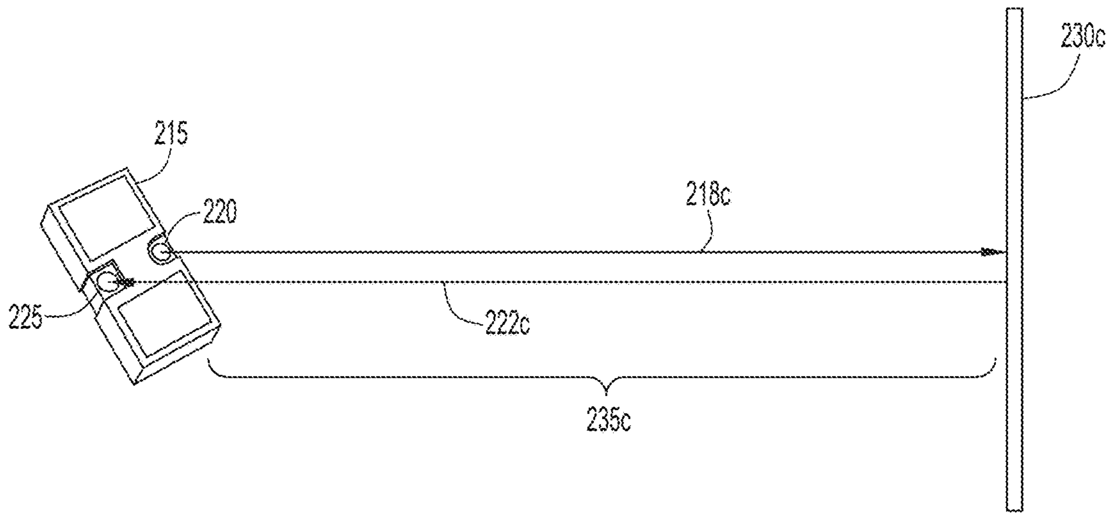
FIG. 2C illustrates a time-of-flight sensor implementing the time-of-flight sensor-based cover detection techniques of the present disclosure, in which the time-of-flight sensor senses a third distance from the sensor to a target, according to an example embodiment.
Figure 2D:
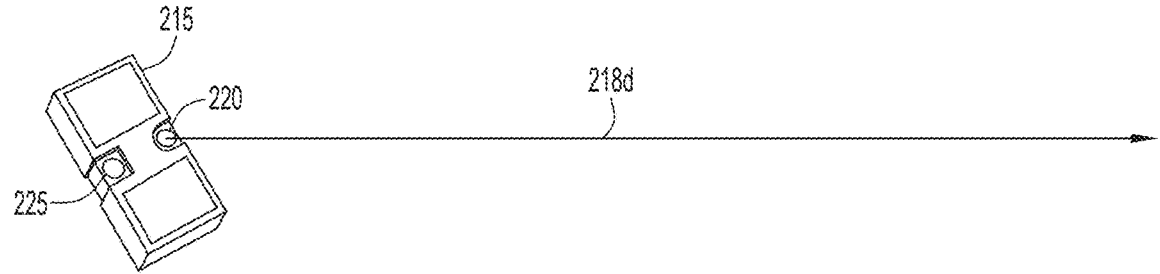
FIG. 2D illustrates a time-of-flight sensor implementing the time-of-flight sensor-based cover detection techniques of the present disclosure in which no target is present, according to an example embodiment.

If no target is present, as is the case in FIG. 2D, then the light does not return to the time-of-flight sensor 215. If there is a target 230*a-c* within the line of sight of emitter 220, as illustrated in FIGS. 2A-C, time-of-flight sensor 215 will determine the time time-of-flight between the emission of emitted signal 218*a-c* and receipt of reflected signals 222*a-c* at receiver 225. Time-of-flight sensor 215 may then provide a signal that includes data indicative of this time-of-flight. This time signal provided by time-of-flight sensor 215 is how a time-of-flight sensor derives its name—the signal provided by time-of-flight sensor 215 is indicative of the time-of-flight for the signal emitter by emitter 220 to travel to the target 230*a-c* and reflect back to receiver 225. Because the speed of the emitted signal is known, in this case it would be the speed of light in air, the distance 235*a-c* may be determined from the time data provided by time-of-flight sensor 215. Using the distance between time-of-flight sensor 215 and target 230*a-c*, the controller/processor may reliably determine the status of the module slots, i.e., covered, not covered, including a module, etc. For example, a distance to target 230*a-c* that is within a certain threshold may be indicative of a correctly placed and secured cover. A distance shorter than this threshold may be indicative of an attempt by a user or malicious actor to circumvent the use of a cover. A distance greater than the threshold or an indication that a reflected signal 220*a-c* was not received by the receiver 225 may be an indication that no cover is present.

In FIG. 2A, time-of-flight sensor 215 is arranged within a module slot of a network device, such as a UIM or SUPV module slot of IIOT router 100. Target 230*a* is a distance 235*a* from time-of-flight sensor 215. Time-of-flight sensor 215 provides emitted signal 218*a* from emitter 220 which is incident on target 230*a*. Reflected signal 222*a* is reflected from target 230*a* and is detected by receiver 225. Time-of-flight sensor 215 is further configured to provide a signal (i.e., time-of-flight sensor data) indicative of the time between the emission of the emitted signal 218*a* by emitter 220 and receipt of reflected signal 222*a* by receiver 225. A processor receiving the time-of-light sensor data may use this data to determine distance 235*a*.

Depending on the distance from sensor 215 to the target, 230*a* it may be determined if target 230*a* is the cover or some other obstruction. For example, distance 235*a* may be within a predetermined threshold, and therefore, it may be determined that target 230*a* is a correctly installed cover, such as cover 145 of FIG. 1C. FIG. 2B, on the other hand, illustrates a shorter distance 235*b* between time-of-flight sensor 215 and target 230*b*. Accordingly, it may be determined from the signals provided by time-of-flight sensor 215 that target 230*b* represents some type of obstruction other than a correctly installed cover, such as an attempt by a user or a malicious actor to circumvent the use of a cover. Turning to FIG. 2C, distance 235*c* is larger than distance 235*a* of FIG. 2A. Accordingly, target 230*c* may also be determined as another type of obstruction other than a correctly installed cover. Finally, as illustrated in FIG. 2D, if no reflected signal is received at receiver 225 after the emission of emitted signal 218*d*, it may be determined that the slot associated with time-of-flight sensor 215 is completely open.

As suggested by the discussion above, for the time-of-flight sensors to detect the presence of a target, such as cover 145 of FIG. 1C, the emitter of the sensor should have line of sight to the target. According to specific embodiments of the disclosed techniques, time-of-flight sensors may be arranged as illustrated and now described with respect to FIGS. 3 and 4.

Figure 3:
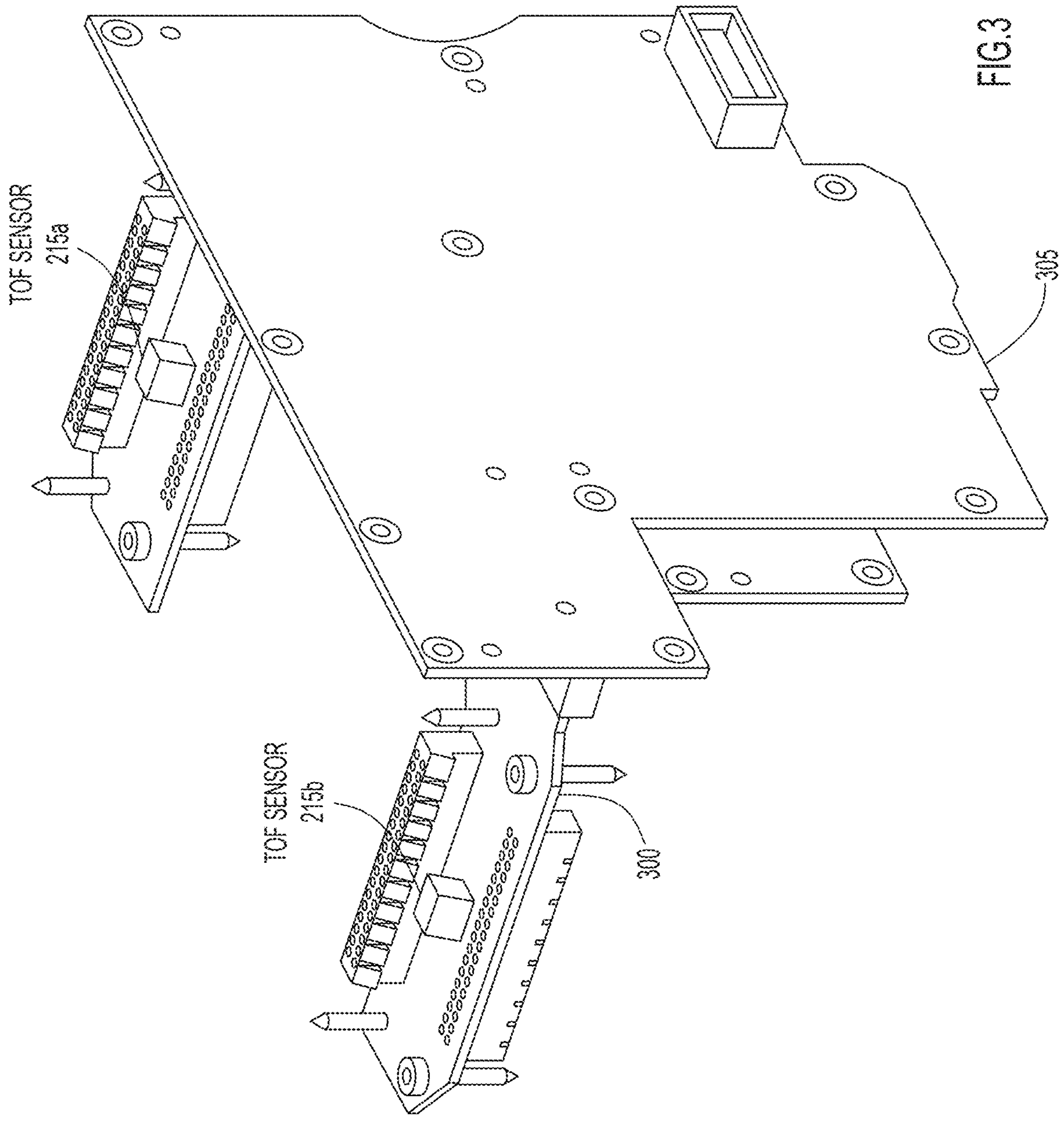
FIG. 3 is a set of network device printed circuit boards configured to implement the time-of-flight sensor-based cover detection techniques of the present disclosure, according to an example embodiment.
Figure 4:
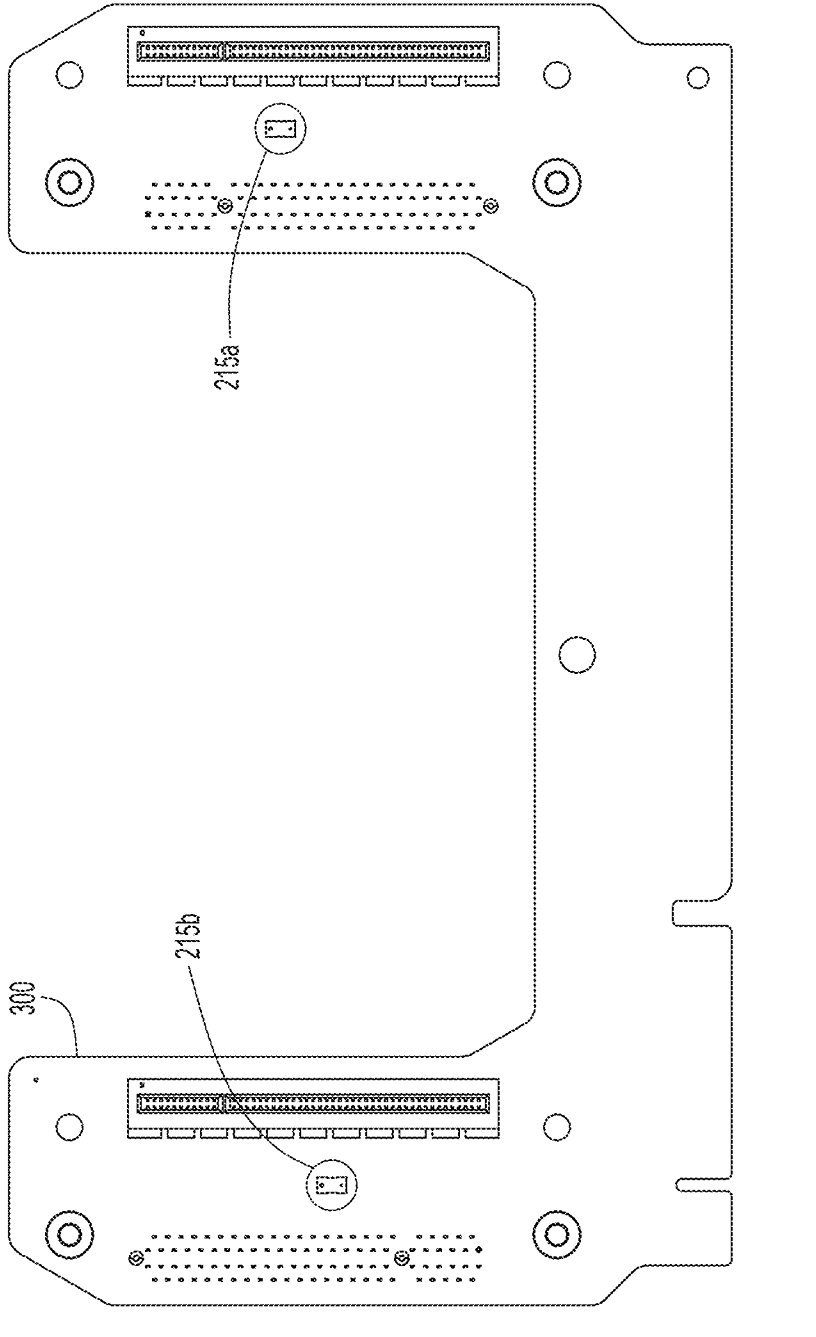
FIG. 4 is a top view of a midplane printed circuit board of a network device configured to implement the time-of-flight sensor-based cover detection techniques of the present disclosure, according to an example embodiment.

As illustrated in FIG. 3, time-of-flight sensors 215*a* and 215*b* may be connected to a printed circuit board (PCB) of a network device, such as IIOT router 100 of FIGS. 1A-C. As illustrated in FIG. 3, IIOT router 100 of FIGS. 1A-C includes two circuit boards-midplane circuit board 300 and backplane circuit board 305. Time-of-flight sensor 215*a* is arranged on midplane circuit board 300 such that its emitter and receiver face outward into module slot 105*a* of FIGS. 1A-C, providing line-of-sight between the emitter and receiver and an appropriately placed cover. Similarly, time-of-flight sensor 215*b* is arranged on midplane circuit board 300 such that its emitter and receiver face outward into module slot 105*b* of FIGS. 1A-C, providing line-of-sight between the emitter and receiver and an appropriately placed cover. Additional time-of-flight sensors may be arranged on the underside of midplane circuit board 300 such that the emitters and receivers of the sensors face outward into module slots 105*c* and 105*d* of FIGS. 1A-C, respectively. FIG. 4 provides a top view of midplane circuit board 300, showing the location of time-of-flight sensors 215*a* and 215*b* on midplane circuit board 300.

Figure 5:
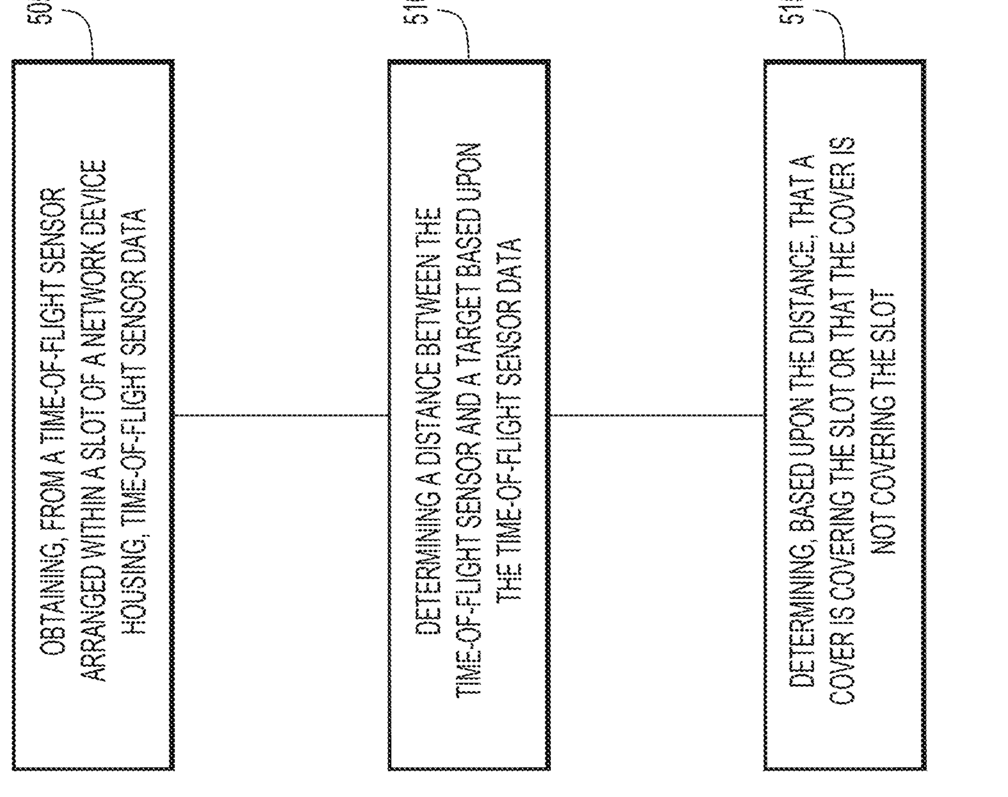
FIG. 5 is a flowchart illustrating a process flow for implementing the time-of-flight sensor-based cover detection techniques of the present disclosure, according to an example embodiment.

With reference now made to FIG. 5, depicted therein is a flowchart 500 illustrating a process flow for implementing the time-of-flight sensor-based cover detection techniques disclosed herein.

Flowchart 500 beings in operation 505 in which time-of-flight sensor data is obtained. The time-of-flight sensor data is obtained from a time-of-flight sensor arranged within a slot of a network device housing. Accordingly, operation 505 may be embodied as a processor of a network device, such as an IIOT router, receiving time-of-flight sensor data from a time-of-flight sensor arranged within a module slot of the IIOT router. The time-of-flight sensor recited in operation 505 may be embodied and arranged as illustrated by the time-of-flight sensors shown in FIGS. 1A-C, 2A-D, 3 and 4, above.

In operation 510, a distance between the time-of-flight sensor and a target is determined based upon the time-of-flight sensor data. For example, operation 510 may be embodied as the distance determinations described with reference to FIGS. 2A-D, above.

Finally, it is determined in operation 515 that a cover is covering the slot or that a cover is not covering the slot. This determination is based upon the distance that is determined in operation 510. For example, if the distance determined in operation 510 does not deviate from one or more threshold values, it may be determined that a cover is covering the slot. Consider certain example embodiments in which it is known for a particular network device that a slot cover, if present, is located 6 inches from the time-of-flight sensor. If the distance determined in operation 510 is between 5 inches and 7 inches, it may be determined in operation 515 that the cover is present. On the other hand, if the distance determined in operation 510 is less than or greater than one or more thresholds, it may be determined that the cover is not present. For example, if the distance determined in operation 510 is less than 5 inches, it may be determined that something other than the cover is blocking the time-of-flight sensor. According to another example, if the distance determined in operation 510 is greater than 7 inches, it may be determined in operation 515 that the cover is missing and the slot is open.

Listed below are advantages that may be achieved by specific example embodiments of the time-of-flight sensor-based cover detection techniques disclosed herein, particularly as compared to mechanical switch-based cover detection techniques.

Cost: Mechanical based systems require mechanical switches and cables that may be more expensive than time-of-flight sensors.

Ease of Installation and/or Time of Installation: During the chassis installation into the network device housing, mechanical switch-based systems may require an extra cable assembly. On the other hand, the time-of-flight sensor techniques disclosed herein may be implemented through electronics incorporated into the network device PCB and which may not require such additional installation steps.

Reliability: Mechanical systems are prone to wear and tear and the chances of the mechanical switch malfunctioning are very high. However, time-of-flight sensors are very accurate and are less prone to wear and tear.

The use of time-of-flight sensors may solve known problems in the art and may also provide important solutions and advantages, as described below.

Problem: Related art outdoor IP67-rated network devices do not electrically detect if an empty module slot has a blank cover installed or not. Related art mechanically-based detection solutions may not be as reliable as the techniques disclosed herein, and may be more prone to mechanical wear and tear.

Solution: Network device module slots are equipped with time-of-flight sensor-based circuitry according to the disclosed techniques. The time-of-flight sensors enable network devices to electrically detect if the module slot is covered or not.

Advantages: Compared to mechanical solutions, the time-of-flight sensor-based techniques disclosed herein may be more cost effective, save time during installation, may be more reliable and may not experience substantial mechanical wear and tear.

Additional benefits of the use of the time-of-flight sensors techniques of this disclosure are detailed below.

The Failure in Time (FIT) rate of time-of-flight sensors is significantly lower than the FIT rate of related art mechanical switches. Accordingly, a time-of-flight-based system may be more reliable than a mechanical switch system in terms of FIT rate.

The cost of a time-of-flight sensor itself may be higher than that of a mechanical switch. However, the cost of the mechanical switch with the wire assembly needed to install the switch may be greater than the cost of the time-of-flight sensor. Accordingly, there may be cost savings in replacing the mechanical switch with the time-of-flight device.

The time-of-flight sensor may be easily integrated into the router.

The time-of-flight sensor may use a surface-mount package, which can be reflowable. Accordingly, a time-of-flight sensor may not require manual installation, i.e., no soldering of wires, no screws for mounting, etc.

A single power supply may be used for the router and the time-of-flight sensor.

The time-of-flight sensor may use two PCB traces for communication with the CPU: an interface for control and data transfer, and a programmable address allowing the addition of multiple sensors on the same CPU bus.

The time-of-flight sensor may use General Purpose Input/Output (GPIO) for reset and interrupt.

Time-of-flight sensors may be based upon a Class 1 laser at 940 nm (for eye safety) with high immunity to ambient light. For higher accuracy, calibration may be performed once at manufacturing.

Calibration data may be stored in the host. This calibration may be transparent to the end-user. The speed of ranging is 30 ms with +/−4% accuracy.

The time-of-flight sensor may be foolproof in the sense that the time-of-flight sensor is easy to use and secure. There may be no command line interface (CLI) to be entered by the user. The ranging may be measured in a continuous mode. If the ranging is outside a window of thresholds, an interrupt may be generated. The thresholds may be programmable and pre-set at the factory.

Unlike mechanical switches which distinguish between two states, the time-of-flight sensor techniques of this disclosure can distinguish between three or more states. Consider an example network device in which the cover may be approximately 6 inches away from the time-of-flight sensor. Therefore, the time-of-flight sensor may be configured to distinguish between three non-precise states:

If the time-of-flight distance measured is greater than 7 inches the cover is missing at the empty slot.

If the time-of-flight distance measured is between 5 inches and 7 inches the cover is present.

If the time-of-flight distance measured is less than 5 inches something other than the cover is blocking the sensor at the expected empty slot (such as when a module is actually present but not detected by the presence detect pin, or if the time-of-flight sensor's protective film was accidentally left on during assembly).

Additional states may also be detected. For example, a threshold may be established that will allow the network device to distinguish between the presence of a module arranged in the slot and the presence of the above-described protective film. Additionally, the time-of-flight sensor data may be used in conjunction with other data to make further determinations. According to one such example, when a module is arranged within a slot, it may provide an electrical signal indicating that a module is arranged within the slot. Signals from the time-of-flight sensor may be used to confirm the presence of the module. A mechanical switch, on the other hand, has a lever to activate the on/off position. This allows the mechanical switch to detect only two states. Furthermore, such a mechanical switch may have a travel distance of about 1 mm (0.04 inches). Accordingly, a hacker can use a credit card to "fool" the mechanical switch. With the time-of-flight sensor, hacking may be more difficult. For example:

Taping the opening of the time-of-flight sensor at the sensor itself will trigger an alert because it is less than 5 inches away.

Blocking at the slot opening 6 inches away to mimic a cover is not as easy because there is no visual target or reference.

Furthermore, hackers may be prevented from having full access to that slot if they have to block a light beam somewhere in the center of the slot opening.

Figure 6:
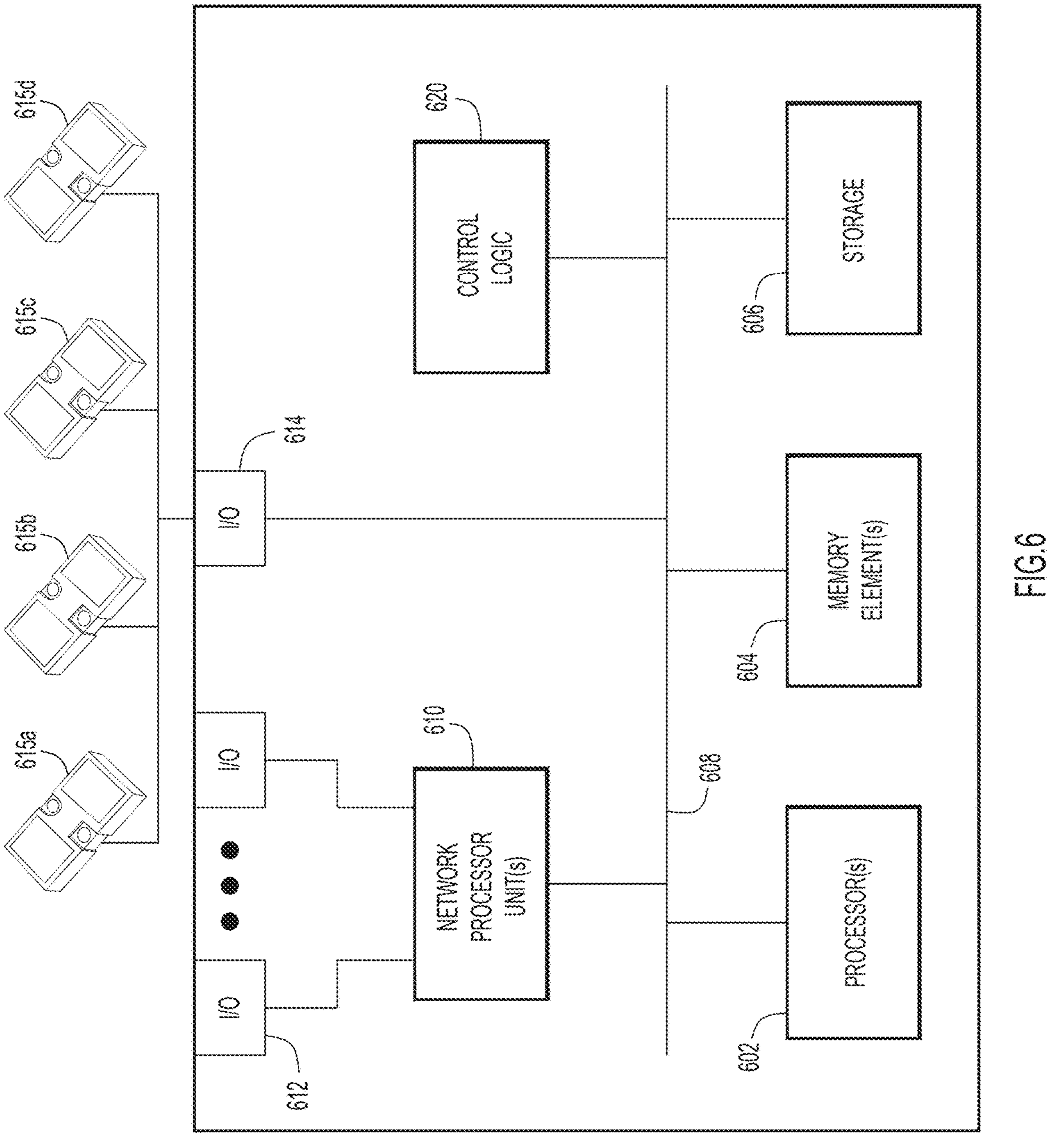
FIG. 6 illustrates a hardware block diagram of a computing device configured to perform functions associated with the time-of-flight sensor-based cover detection techniques of the present disclosure, according to an example embodiment.

Referring to FIG. 6, FIG. 6 illustrates a hardware block diagram of a computing device 600 that may perform functions associated with operations discussed herein in connection with the techniques depicted in FIGS. 1A-C, 2A-D and 3-5. In various embodiments, a computing device or apparatus, such as computing device 600 or any combination of computing devices 600, may be configured as any entity/entities as discussed for the techniques depicted in connection with FIGS. 1A-C, 2A-D and 3-5 in order to perform operations of the various techniques discussed herein.

In at least one embodiment, the computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein. I/O interface(s) 614 may be configured to provide and obtain signals from time-of-flight sensors 615*a*, 615*b*, 615*c*, 615*d* (615*a-d*), which correspond to the time-of-flight sensors illustrated in FIGS. 2A-D, 3 and 4.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques described herein relate to an apparatus including: a network device housing including a slot configured to receive a network device module; a time-of-flight sensor including an emitter and a receiver, wherein the time-of-flight sensor is arranged within the network device housing such that the emitter and the receiver have line-of-sight to a location relative to the network device housing at which a cover for the slot is arranged; and one or more processors communicatively coupled to the time-of-flight sensor.

In some aspects, the techniques described herein relate to an apparatus, wherein the one or more processors are configured to: obtain time-of-flight sensor data from the time-of-flight sensor; and determine, based upon the time-of-flight sensor data, that the cover is covering the slot or that the cover is not covering the slot.

In some aspects, the techniques described herein relate to an apparatus, wherein the one or more processors are configured to determine that the cover is covering the slot or that the cover is not covering the slot by: determining, from the time-of-flight sensor data, a distance between the time-of-flight sensor and a target that reflects light emitted by the emitter back to the receiver; and comparing the distance between the time-of-flight sensor and the target to one or more threshold values indicative of the cover covering the slot or indicative of the cover not covering the slot.

In some aspects, the techniques described herein relate to an apparatus, wherein the time-of-flight sensor data includes data indicative of a signal emitted by the emitter not being received at the receiver; and wherein the one or more processors are configured to determine that the cover is not covering the slot in response to obtaining the data indicative of the signal emitted by the emitter and not being received at the receiver.

In some aspects, the techniques described herein relate to an apparatus, wherein the time-of-flight sensor data includes data indicative of a time between when a signal is emitted from the emitter towards the location relative to the network device housing and when the signal is received by the receiver.

In some aspects, the techniques described herein relate to an apparatus, wherein the emitter includes a laser diode and the receiver includes a photodetector diode.

In some aspects, the techniques described herein relate to an apparatus, wherein the emitter is configured to emit infrared laser light and the receiver is configured to detect the infrared laser light.

In some aspects, the techniques described herein relate to an apparatus, wherein the network device housing includes a network router housing.

In some aspects, the techniques described herein relate to an apparatus, wherein the network router housing includes an industrial Internet-of-Things router housing.

In some aspects, the techniques described herein relate to an apparatus wherein the cover is configured to provide ingress protection to the slot.

In some aspects, the techniques described herein relate to a method including: obtaining, from a time-of-flight sensor arranged within a slot of a network device housing, time-of-flight sensor data; determining a distance between the time-of-flight sensor and a target based upon the time-of-flight sensor data; and determining, based upon the distance, that a cover is covering the slot or that the cover is not covering the slot.

In some aspects, the techniques described herein relate to a method, wherein determining that the cover is covering the slot or that the cover is not covering the slot includes: determining, from the time-of-flight sensor data, a distance between the time-of-flight sensor and a target that reflects a signal emitted by an emitter of the time-of-flight sensor back to a receiver of the time-of-flight sensor; and comparing the distance between the time-of-flight sensor and the target to one or more threshold values indicative of the cover covering the slot or indicative of the cover not covering the slot.

In some aspects, the techniques described herein relate to a method, wherein the time-of-flight sensor data includes data that indicates that a signal emitted by an emitter of the time-of-flight sensor was not received at a receiver of the time-of-flight sensor; the method further including determining that the cover is not covering the slot in response to obtaining the data that indicates that the signal emitted by the emitter of the time-of-flight sensor was not received at the receiver of the time-of-flight sensor.

In some aspects, the techniques described herein relate to a method, wherein the time-of-flight sensor data includes data indicative of a time between when a signal is emitted from an emitter of the time-of-flight sensor towards a location relative to the network device housing at which the cover for the slot is arranged and when the signal is received by a receiver of the time-of-flight sensor.

In some aspects, the techniques described herein relate to a method, wherein the network device housing includes an industrial Internet-of-Things router housing.

In some aspects, the techniques described herein relate to one or more tangible, non-transitory computer readable mediums encoded with instructions, wherein the instructions, when executed by one or more processors, are operable to: obtain, from a time-of-flight sensor arranged within a slot of a network device housing, time-of-flight sensor data; determine a distance between the time-of-flight sensor and a target based upon the time-of-flight sensor data; and determine, based upon the distance, that a cover is covering the slot or that the cover is not covering the slot.

In some aspects, the techniques described herein relate to one or more tangible, non-transitory computer readable mediums, wherein the instructions operable to determine that the cover is covering the slot or that the cover is not covering the slot include instructions operable to: determine, from the time-of-flight sensor data, a distance between the time-of-flight sensor and a target that reflects a signal emitted by an emitter of the time-of-flight sensor back to a receiver of the time-of-flight sensor; and compare the distance between the time-of-flight sensor and the target to one or more threshold values indicative of the cover covering the slot or indicative of the cover not covering the slot.

In some aspects, the techniques described herein relate to one or more tangible, non-transitory computer readable mediums, wherein the time-of-flight sensor data includes data that indicates that a signal emitted by an emitter of the time-of-flight sensor was not received at a receiver of the time-of-flight sensor; wherein the instructions are further operable to determine that the cover is not covering the slot in response to obtaining the data that indicates that the signal emitted by the emitter was not received at the receiver.

In some aspects, the techniques described herein relate to one or more tangible, non-transitory computer readable mediums, wherein the time-of-flight sensor data includes data indicative of a time between when a signal is emitted from an emitter of the time-of-flight sensor towards a location relative to the network device housing at which the cover for the slot is arranged and when the signal is received by a receiver of the time-of-flight sensor.

In some aspects, the techniques described herein relate to one or more tangible, non-transitory computer readable mediums, wherein the network device housing includes an industrial Internet-of-Things router housing.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. An apparatus comprising:

a network router housing comprising a first slot to receive a first network device module and a second slot adjacent to the first slot and configured to receive a second network device module;

a printed circuit board of the first network device module, wherein the printed circuit board is arranged across the first slot and the second slot;

a first time-of-flight sensor and a second time-of-flight sensor respectively configured on the printed circuit board in the first slot and the second slot, each time-of-flight sensor respectively comprising an emitter and a receiver arranged to have line-of-sight to a location at which a cover of a respective slot is arranged; and one or more processors communicatively coupled to each time-of-flight sensor and configured to:

obtain time-of-flight sensor data from a time-of-flight sensor of the first time-of-flight sensor and the second time-of-flight sensor; and determine, based upon the time-of-flight sensor data, that the cover is covering the respective slot or that the cover is not covering the respective slot for the time-of-flight sensor.

2. The apparatus of claim 1, wherein the first network device module and the second network device module are each selected from a group consisting of a fifth generation broadband cellular network (5G) module, an advanced Long-Term-Evolution (LTE) module, local area network (LAN) module, and a wide area network (WAN) module.

3. The apparatus of claim 2, wherein the one or more processors are configured to determine that the cover is covering the respective slot or that the cover is not covering the respective slot by:

determining, from the time-of-flight sensor data, a distance between the time-of-flight sensor and a target that reflects light emitted by the emitter back to the receiver; and comparing the distance between the time-of-flight sensor and the target to one or more threshold values indicative of the cover covering the respective slot or indicative of the cover not covering the respective slot.

4. The apparatus of claim 2, wherein:

the time-of-flight sensor data comprises data indicative of a signal emitted by the emitter not being received at the receiver; and the one or more processors are configured to determine that the cover is not covering the respective slot in response to obtaining the data indicative of the signal emitted by the emitter and not being received at the receiver.

5. The apparatus of claim 2, wherein the time-of-flight sensor data comprises data indicative of a time between when a signal is emitted from the emitter towards the location relative to the network router housing and when the signal is received by the receiver.

6. The apparatus of claim 1, wherein the emitter comprises a laser diode and the receiver comprises a photodetector diode.

7. The apparatus of claim 1, wherein the emitter is configured to emit infrared laser light and the receiver is configured to detect the infrared laser light.

8. The apparatus of claim 1, wherein the first network device module comprises a router.

9. The apparatus of claim 1, wherein the network router housing comprises an industrial Internet-of-Things router housing.

10. The apparatus of claim 1, wherein the cover is configured to provide ingress protection to the respective slot.

11. A method comprising:

providing a network router housing comprising a first slot to receive a first network device module and a second slot adjacent to the first slot and configured to receive a second network device module;

providing a printed circuit board of the first network device module, wherein the printed circuit board is arranged across the first slot and the second slot;

providing a first time-of-flight sensor and a second time-of-flight sensor respectively configured on the printed circuit board in the first slot and the second slot, each time-of-flight sensor respectively comprising an emitter and a receiver having line-of-sight to a location at which a cover of a respective slot is arranged;

obtaining, from a time-of-flight sensor of the first time-of-flight sensor and the second time-of-flight sensor, time-of-flight sensor data;

determining a distance between the time-of-flight sensor and a target based upon the time-of-flight sensor data; and determining, based upon the distance, that the cover is covering the respective slot or that the cover is not covering the respective slot for the time-of-flight sensor.

12. The method of claim 11, wherein determining that the cover is covering the respective slot or that the cover is not covering the respective slot comprises:

determining, from the time-of-flight sensor data, the distance between the time-of-flight sensor and the target that reflects a signal emitted by the emitter of the time-of-flight sensor back to the receiver of the time-of-flight sensor; and comparing the distance between the time-of-flight sensor and the target to one or more threshold values indicative of the cover covering the respective slot or indicative of the cover not covering the respective slot.

13. The method of claim 11, wherein the time-of-flight sensor data comprises data that indicates that a signal emitted by the emitter of the time-of-flight sensor was not received at the receiver of the time-of-flight sensor, the method further comprising determining that the cover is not covering the respective slot in response to obtaining the data that indicates that the signal emitted by the emitter of the time-of-flight sensor was not received at the receiver of the time-of-flight sensor.

14. The method of claim 11, wherein the time-of-flight sensor data comprises data indicative of a time between when a signal is emitted from the emitter of the time-of-flight sensor towards the location relative to the network router housing at which the cover for the respective slot is arranged and when the signal is received by the receiver of the time-of-flight sensor.

15. The method of claim 11, wherein the network router housing comprises an industrial Internet-of-Things router housing.

16. One or more tangible, non-transitory computer readable mediums encoded with instructions, wherein the instructions, when executed by one or more processors in a network router housing that comprises a first slot to receive a first network device module and a second slot adjacent to the first slot and configured to receive a second network device module, a printed circuit board of the first network device module, wherein the printed circuit board is arranged across the first slot and the second slot, a first time-of-flight sensor and a second time-of-flight sensor respectively configured on the printed circuit board in the first slot and the second slot, each of the first time-of-flight sensor and second time-of-flight sensor respectively comprising an emitter and a receiver having line-of-sight to a location at which a cover for a respective slot is arranged, are operable to:

obtain, from a time-of-flight sensor of the first time-of-flight sensor and the second time-of-flight sensor, time-of-flight sensor data;

determine a distance between the time-of-flight sensor and a target based upon the time-of-flight sensor data; and determine, based upon the distance, that the cover is covering the respective slot or that the cover is not covering the respective slot for the time-of-flight sensor.

17. The one or more tangible, non-transitory computer readable mediums of claim 16, wherein the instructions operable to determine that the cover is covering the respective slot or that the cover is not covering the respective slot comprise instructions operable to:

determine, from the time-of-flight sensor data, the distance between the time-of-flight sensor and the target that reflects a signal emitted by the emitter of the time-of-flight sensor back to the receiver of the time-of-flight sensor; and compare the distance between the time-of-flight sensor and the target to one or more threshold values indicative of the cover covering the respective slot or indicative of the cover not covering the respective slot.

18. The one or more tangible, non-transitory computer readable mediums of claim 16, wherein the time-of-flight sensor data comprises data that indicates that a signal emitted by the emitter of the time-of-flight sensor was not received at the receiver of the time-of-flight sensor;

wherein the instructions are further operable to determine that the cover is not covering the respective slot in response to obtaining the data that indicates that the signal emitted by the emitter was not received at the receiver.

19. The one or more tangible, non-transitory computer readable mediums of claim 16, wherein the time-of-flight sensor data comprises data indicative of a time between when a signal is emitted from the emitter of the time-of-flight sensor towards the location relative to the network router housing at which the cover for the respective slot is arranged and when the signal is received by the receiver of the time-of-flight sensor.

20. The one or more tangible, non-transitory computer readable mediums of claim 16, wherein the network router housing comprises an industrial Internet-of-Things router housing.

* * * * *